May 21, 1963 — C. M. LIVINGSTON — 3,090,187

LIQUID DISTRIBUTING MOWER BLADE

Filed Dec. 5, 1960

INVENTOR.
Charles M. Livingston
BY
Robert J. Patch
ATTY.

United States Patent Office 3,090,187
Patented May 21, 1963

3,090,187
LIQUID DISTRIBUTING MOWER BLADE
Charles M. Livingston, 5039 W. 6th St., Tulsa, Okla.
Filed Dec. 5, 1960, Ser. No. 73,629
9 Claims. (Cl. 56—295)

The present invention relates to mowers and mower blades adapted to move over the ground to cut down vegetation, more particularly to such mowers and mower blades having means for applying a liquid such as a weed killer to the cut vegetation.

In the course of clearing land and keeping it cleared, it is necessary periodically to cut back the slash, that is, the small brush, saplings and shrubs which grow in profusion on land that has been cleared of trees. In the past, it has been necessary to do this several times during the growing season, for example by means of motor driven rotary mowers. Although this technique is effective to keep a slash cut back, it is a time-consuming and expensive operation because it must be performed repeatedly during the growing season.

Accordingly, it is an object of the present invention to provide a mower that will not only cut vegetation but also apply a growth-inhibiting chemical to the cut vegetation.

Another object of the present invention is the provision of a mower blade adapted to distribute liquid during its operation.

Still another object of the present invention is the provision of a mower and mower blade having means for introducing liquid onto the underside of the mower blade and particularly onto the underside of the cutting tips of the mower blade.

Finally, it is an object of the present invention to provide a mower and mower blade that will be relatively simple and inexpensive to manufacture, easy to operate, maintain and repair, and rugged and durable in use.

Other objects and advantages of the present invention will become apparent from a consideration of the following description, taken in conjunction with the accompanying drawing, in which.

Figure 1:
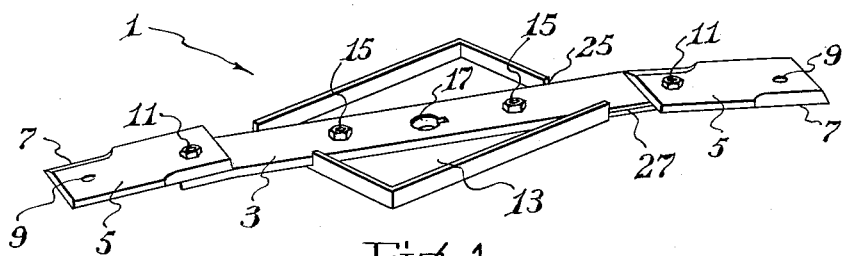
FIGURE 1 is a perspective view of a mower blade assembly according to the present invention.
Figure 2:
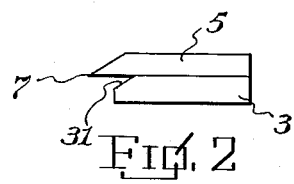
FIGURE 2 is an enlarged end view of a mower blade according to the present invention.
Figure 3:
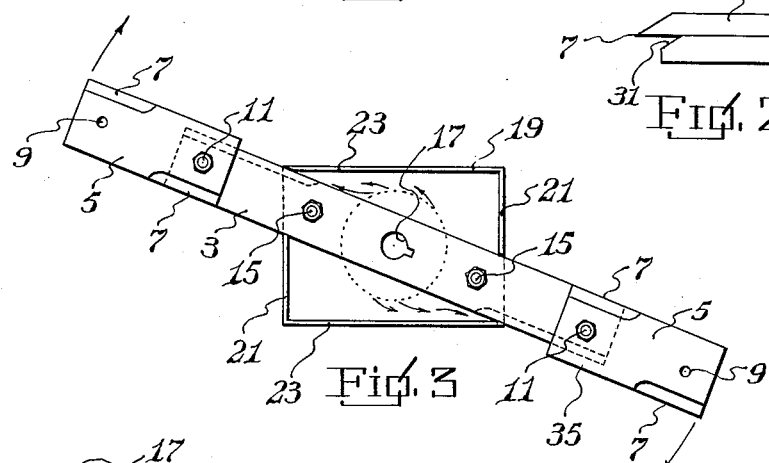
FIGURE 3 is a plan view of the structure of FIGURE 1.
Figure 4:
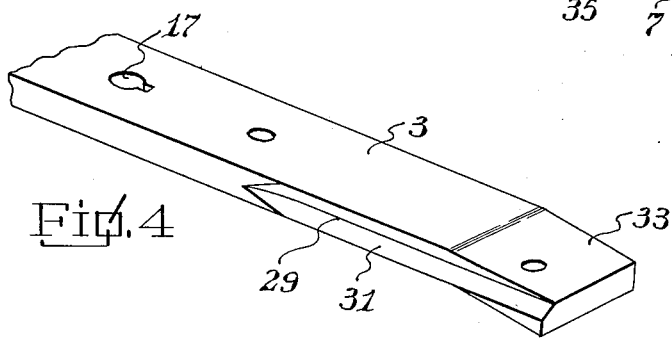
FIGURE 4 is an enlarged fragmentary perspective view of a portion of a cutter blade with the cutter tip removed.
Figure 5:
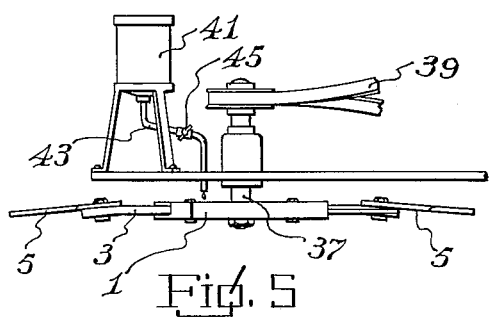
FIGURE 5 is an elevational view of a portion of a mower with a mower blade according to the present invention in operative position thereon.

Referring now to the drawing in greater detail, there is shown a mower blade indicated generally at 1 and comprising an elongated base portion 3 in the form of a flat bar of steel or the like. Mounted on each end of base portion 3 for horizontal swinging movement about a generally upright axis is a cutter tip 5 each of which is provided with a pair of cutting edges 7 in mirror image relationship to each other at opposite ends of tip 5, so that tip 5 may be reversed by detaching it from base portion 3, turning it end-for-end, and reattaching it to base portion 3, in the manner well known in this art. Each cutter tip 5 is provided with a hole 9 adjacent each end thereof, and bolts 11 mount the tips loosely on base portion 3 for pivotal movement of the tips about the bolts in the usual manner. Thus far, the structure as described is completely conventional.

An open-topped, flat, shallow receptacle 13 is secured to the underside of base portion 3 of the blade by means of bolts 15 extending through base portion 3 and receptacle 13. A non-circular hole 17 extends through base portion 3 and through the bottom of the receptacle 13 to mount the blade for rotation about a vertical axis.

Receptacle 13 is flat-bottomed and is provided with an upstanding marginal edge 19. In the illustrated embodiment, the bottom of receptacle 13 is rectangular, so that marginal edge 19 is comprised of a pair of opposed relatively short sides 21 and a pair of opposed relatively long sides 23. Short sides 21 are recessed as at 25 for the reception of base portion 3 with base portion 3 disposed at an acute angle both to sides 21 and to sides 23, and with the leading edges of base portion 3 with reference to the direction of rotation of the blade disposed in what would otherwise be the corners between sides 21 and 23. Marginal edge 19 is at least as high as base portion 3 is thick.

A passageway 27 is provided which communicates between receptacle 13 and the underside of each cutter top 5. Specifically, this passageway is in the form of a groove 29 recessed in the leading edge of each end of base portion 3. Groove 29 extends from a point well within receptacle 13 out to the end of base portion 3, this outer end of base portion 3 being disposed under cutter tip 5.

Groove 29 has a lower edge 31 that provides in effect a bottom of passageway 27 outwardly of receptacle 13. Moving in the direction of the outer end of base portion 3, lower edge 31 approaches the underside of cutter tip 5. To this end, the outer ends of base portion 3 are provided with downwardly outwardly inclined bevels 33, and lower edge 31 is either horizontal, or as in the present example somewhat upwardly outwardly inclined so that the lower surface of base portion 3 and groove 29 are in effect disposed at an acute angle to each other. Moreover, cutter tip 5 overhangs the leading edge of the outer end of base portion 3, as shown at 35, so that the outer end of groove 29 is overlaid by a substantial width of cutter tip 5 on either side of the outer end of groove 29.

This mower blade assembly 1 is mounted beneath a portion of a mower at the lower end of a vertical driven shaft 37 which has a pulley at its upper end for receiving the usual drive belt 39. The driven shaft 37 is mounted on a forward extension of the frame of the mower, and on this forward extension is also mounted a liquid container 41 above blade 1. Container 41 has a drip conduit 43 controlled by a valve 45, and the lower end of conduit 43 is positioned a short distance above receptacle 13.

The operation of the device is as follows:

Liquid container 41 is filled with a solution or suspension of any of the well known weed killers or plant growth inhibitors, and valve 45 is adjusted so as to provide a steady drip of liquid from container 41 into receptacle 13. As the mower blade is rotated under the influence of shaft 37 and drive belt 39, the liquid in receptacle 13 is thrown outward by centrifugal force and tends to crowd into the corner formed between the leading edge of base portion 3 and the adjacent long side 23 of the upstanding marginal edge 19 of receptacle 13. The inner end of passageway 27 opens within this corner, however, so that the liquid tends to enter passageway 27 and run radially outward along groove 29 on the leading edge of base portion 3. The speed of rotation of blade 1 maintains the liquid in groove 29, and centrifugal force carries it radially outward along the leading edge of base portion 3, and lower edge 31 of groove 29 in connection with bevel 33 causes the liquid to impinge against the underside of cutter tip 5 within the contour of the lower surface of the cutter tip, that is, inward from all the outer edges of the cutter tip.

The rapidly revolving cutter tips 5, passing through and cutting the slash, cause their undersides to rub against the freshly cut ends of the stubble. But as the growth-inhibiting liquid has been applied to the undersides of the cutter tips, this liquid in turn is smeared across the cut ends of the stubble and is applied very quickly, automatically and efficiently to the freshly cut slash. As a result, it is necessary to cut the slash only, say, once a year rather than, say, three or four times a year.

From a consideration of the foregoing disclosure, it will be obvious that all the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. These and other modifications and variations are considered to be within the purview and scope of the present invention as defined by the appended claims.

What is claimed is:

1. A mower having a mower blade, means mounting the mower blade on the mower for rotation about a vertical axis, a liquid receptacle rotatable with the blade, means for supplying a liquid to the receptacle, and means defining a generally outwardly extending liquid passage between the receptacle and the underside of the blade for centrifugal liquid feed to the underside of the mower blade.

2. A mower as claimed in claim 1, the receptacle comprising an open-topped receptacle having an upstanding edge recessed to receive the blade, said liquid passage extending between the blade and an upright edge of the recess and the blade extending laterally from said liquid passage to the other upright edge of the recess.

3. A mower as claimed in claim 1, said liquid passage being defined by a recess extending lengthwise along the leading edge of the blade.

4. A mower blade rotatable about a vertical axis and comprising a base portion elongated radially of said axis and a cutter tip detachably mounted on the outer end of the base portion, and means defining a liquid passage extending along the leading edge of the base portion and terminating radially outward beneath the cutter tip for supplying liquid to the underside of the cutter tip.

5. A mower blade as claimed in claim 4, and a liquid receptacle rotatable with the blade, the radially inner end of the liquid passage opening into the receptacle.

6. A mower blade as claimed in claim 5, the receptacle comprising an open-topped receptacle having an upstanding edge recessed to receive the base portion of the blade, said liquid passage extending between said base portion and an edge of the recess and said base portion closing the rest of the recess.

7. A mower blade as claimed in claim 6, said liquid passage being defined by a recess extending lengthwise of the leading edge of the blade.

8. A mower blade as claimed in claim 7, the lower edge of the last-named recess radially outwardly approaching the underside of the cutter tip.

9. A mower blade rotatable about a vertical axis and comprising a base portion elongated radially of said axis and terminating outward in a cutter tip, and means defining a liquid passage extending radially outward along the blade and terminating radially outward beneath the cutter tip for supplying liquid to the underside of the blade.

References Cited in the file of this patent

UNITED STATES PATENTS

| | | |
|---|---|---|
| 1,692,617 | Bowen | Nov. 20, 1928 |
| 2,908,444 | Mullin | Oct. 13, 1959 |
| 2,917,241 | Waldrum | Dec. 15, 1959 |
| 2,939,636 | Mullin | June 7, 1960 |
| 2,973,615 | Yaremchuk et al. | Mar. 7, 1961 |